(12) United States Patent
Chappuis et al.

(10) Patent No.: US 10,315,243 B2
(45) Date of Patent: Jun. 11, 2019

(54) METHOD OF MACHINING AN OPENING IN A PLURALITY OF BLANKS

(71) Applicant: FORD MOTOR COMPANY, Dearborn, MI (US)

(72) Inventors: Laurent Bernard Chappuis, Grosse Ile, MI (US); S. George Luckey, Jr., Dearborn, MI (US); Andrey M Ilinich, Novi, MI (US); Keith Zobay, Kenockee, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 254 days.

(21) Appl. No.: 15/219,787

(22) Filed: Jul. 26, 2016

(65) Prior Publication Data

US 2018/0029105 A1    Feb. 1, 2018

(51) Int. Cl.
| | |
|---|---|
| *B21D 53/88* | (2006.01) |
| *B21D 35/00* | (2006.01) |
| *B21D 31/00* | (2006.01) |
| *B21D 28/02* | (2006.01) |
| *B23C 3/12* | (2006.01) |
| *B62D 25/02* | (2006.01) |
| *B62D 65/02* | (2006.01) |
| *B23P 15/00* | (2006.01) |

(52) U.S. Cl.
CPC ............ *B21D 53/88* (2013.01); *B21D 28/02* (2013.01); *B21D 31/005* (2013.01); *B21D 35/007* (2013.01); *B23C 3/12* (2013.01); *B23C 3/128* (2013.01); *B23P 15/00* (2013.01); *B62D 25/02* (2013.01); *B62D 65/02* (2013.01); *B23C 2215/08* (2013.01); *B23C 2220/28* (2013.01); *B23C 2270/16* (2013.01); *B23P 2700/12* (2013.01); *Y10T 29/49622* (2015.01); *Y10T 409/303752* (2015.01); *Y10T 409/303808* (2015.01)

(58) Field of Classification Search
CPC .... B21D 31/005; B21D 35/007; B21D 53/88; B21D 28/02; B23P 15/00; B23P 2700/12; B62D 25/02; B62D 65/02; B23C 3/128; B23C 2220/28; B23C 2215/08; B23K 7/00; Y10T 29/49622
USPC ............................ 72/111, 363; 409/131–132
See application file for complete search history.

(56) References Cited

U.S. PATENT DOCUMENTS

| | | |
|---|---|---|
| 4,278,478 A | 7/1981 | Tidquist |
| 5,088,181 A | 2/1992 | Jeppsson |
| 6,230,379 B1 * | 5/2001 | Shoji ................ B23Q 1/015 29/27 C |

(Continued)

FOREIGN PATENT DOCUMENTS

EP    2886231 A1    6/2015

*Primary Examiner* — Sarang Afzali
(74) *Attorney, Agent, or Firm* — Raymond L. Coppiellie; Brooks Kushman P.C.

(57) ABSTRACT

A method and a system are disclosed for making an article of manufacture from a blank defining an internal opening. A stack of blanks are aligned and the internal openings of the blanks in the stack of blanks are machined by a rotary cutting tool to a finished dimension. The blanks are clamped together before machining in a numerically controlled machine tool. The blanks are subsequently formed individually in a sheet metal forming operation in which the inner perimeter of the internal openings is expanded as the blank is formed.

5 Claims, 4 Drawing Sheets

(56) References Cited

U.S. PATENT DOCUMENTS

| | | | |
|---|---|---|---|
| 6,318,140 B1 * | 11/2001 | Yamagishi | B21D 53/14 72/110 |
| 6,626,075 B2 * | 9/2003 | Hirose | B23B 3/168 82/118 |
| 10,065,276 B2 * | 9/2018 | Azevedo | F16J 1/005 |

* cited by examiner

METHOD OF MACHINING AN OPENING IN A PLURALITY OF BLANKS

TECHNICAL FIELD

This disclosure relates to a method of manufacturing sheet metal blanks that include an opening subsequently formed in a drawing operation or other type of forming operation.

BACKGROUND

Manufacturing sheet metal parts generally begins with a blanking operation where blanks are cut from coils of rolled steel or aluminum. The outer perimeter and large openings may be trimmed to form a blank that is then formed in subsequent drawing, flanging, punching, piercing and hemming processes. One example of a part that is blanked with a large opening is a body side panel that spans the side of a vehicle and defines the opening that receives the doors in a nesting relationship. One problem with forming precut openings in a blank is that in subsequent forming operations the material around the opening must flow from both the inside of the opening and the areas outside the opening. The precut opening is expanded when the blank is formed and may form splits in the material around the opening.

With the need to reduce the weight of vehicles to meet fuel economy standards, the development of sheet metal parts made from aluminum or high strength alloys is increasing. Aluminum and high strength steel are less malleable than mild steel and the problems relating to splitting at the inner perimeter of larger openings is more prevalent. Small cracks or small imperfections in the cut edge formed when aluminum blanks are cut out expand to form splits in a subsequent forming operations because additional metal is drawn from the inside of the opening.

The root causes of splitting at the inner edge of the blank during draw die expansion in subsequent forming operation originates from excessive strain hardening and small imperfections due to rough fracture surfaces, micro-cracks, burrs, and gall marks. Excessive strain hardening and imperfections severely limit the expansion capacity of the metal. Avoiding problems relating to splits caused by imperfections in precut openings in aluminum panels limits opportunities to use aluminum sheet metal parts. Panel splits may cause substantial yield losses in the stamping process due to the need to scrap parts that have splits in critical areas. In addition, problems relating to splits in panels result in cost overruns, supply shortages, potential quality problems, and reduced manufacturing line availability.

This disclosure is directed to solving the above problems and other problems as summarized below.

SUMMARY

According to one aspect of this disclosure, a method is disclosed for manufacturing a sheet metal part. The method includes the steps of cutting a plurality of blanks defining internal openings from a plurality of sheet metal segments. Stacking the plurality of blanks with the internal openings aligned and machining inner perimeters of the internal openings with a rotary cutting tool to a finish dimension.

According to other aspects of the method, the method may further comprise clamping the plurality of blanks together before machining. The blanks may be clamped together in a numerically controlled machine tool. The method may further comprise forming the blanks individually in a sheet metal forming operation, wherein the inner perimeter of the internal openings in the blank are expanded as the blank is formed. The rotary cutting tool may be a milling tool. The sheet metal part may be a body side panel for a vehicle that defines a door or window opening or may be another type of panel having an opening or a critical edge area that is expanded in subsequent forming operations.

According to another aspect of this disclosure, a system is disclosed for manufacturing a sheet metal part from a blank defining an opening. The system comprises stacking a stack of blanks on a base with the openings generally in alignment. A machine tool including a rotary cutter removes material from the openings in the stack of blanks to form a machined blank edge. A forming tool subsequently forms and expands the machined blank edges in each of the machined blanks.

The system may further comprise a clamping apparatus clamping the stack of blanks on the base while the machine tool cuts material from the openings. The base may include a spacer disposed below the stack of blanks providing clearance for the machine tool to cut material from all of the blanks stacked on the base.

According to another aspect of the disclosure an article of manufacture is disclosed that comprises a blank defining an internal opening that is initially punched from a sheet metal segment. An inner periphery of the internal opening is formed as a machined surface. The machined surface may be a milled surface. The article of manufacture may be a body side panel for a vehicle and the internal opening may be a door opening, a window opening, or a relief opening.

According to another aspect of this disclosure, a method is disclosed for manufacturing a sheet metal part by machining inside or outside edges of a blank. The method begins with the step of cutting a plurality of blanks each including a blanked edge from a plurality of sheet metal segments. The blanks are then stacked with the blanked edges generally aligned. The blanked edges of the plurality of blanks are then machined with a machining tool to a finish dimension.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1A:
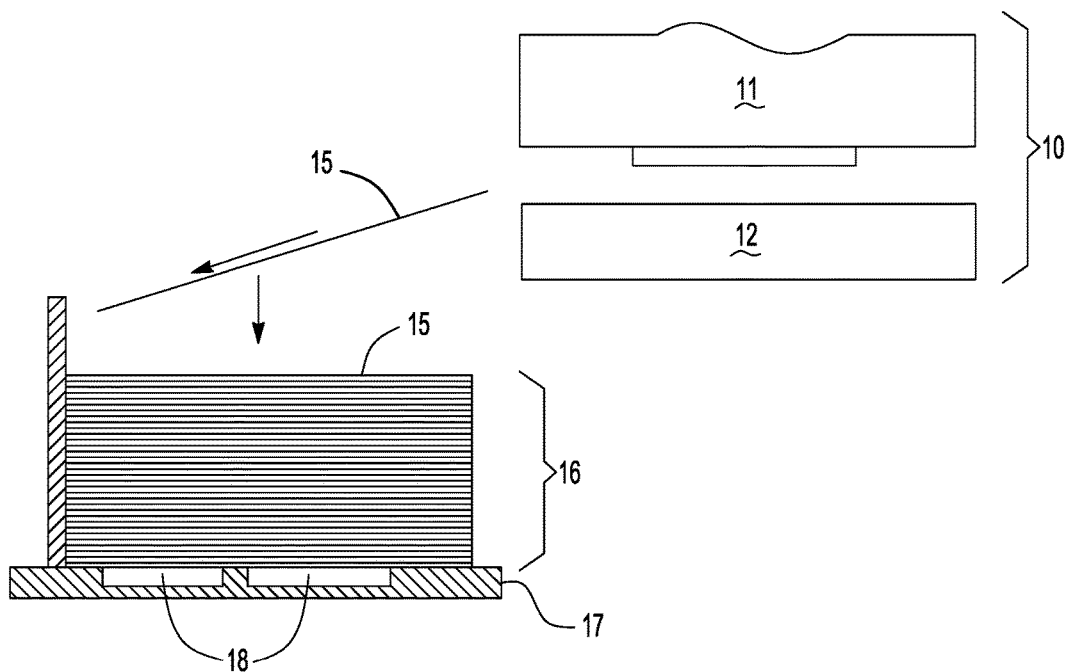
FIG. 1a is an exploded perspective diagrammatic view of a blanking press for cutting openings in a blank and stacking a stack of blanks on a pallet or other supporting surface according to one aspect of this disclosure.
Figure 1B:
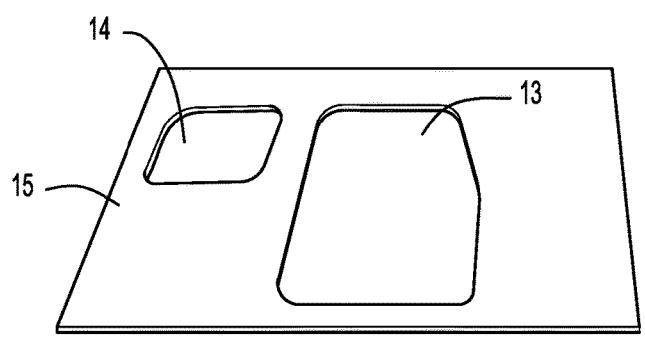
FIG. 1b is a perspective view of one example of a body side panel blank.

Referring to FIGS. 1a and 1b, a blanking press 10 is illustrated that includes an upper blanking die 11 and a lower blanking die 12 that cut large openings, such as a door opening 13, window opening 14, or relief opening in a blank 15. The door opening 13, window opening 14, or relief opening are referred to as internal openings. The blank 15 is placed on a stack 16 of other blanks on a pallet 17 generally in alignment with a stack 16 of other blanks 15 when the internal openings are cut out of the blank 15. The pallet 17 may be of the type used on a stamping press (shown in FIG. 4) or may be a dedicated machining pallet. A space 18 is defined by the supporting member, or pallet 17, below the internal openings to facilitate machining the internal openings in the stack of blanks 16.

Figure 2:
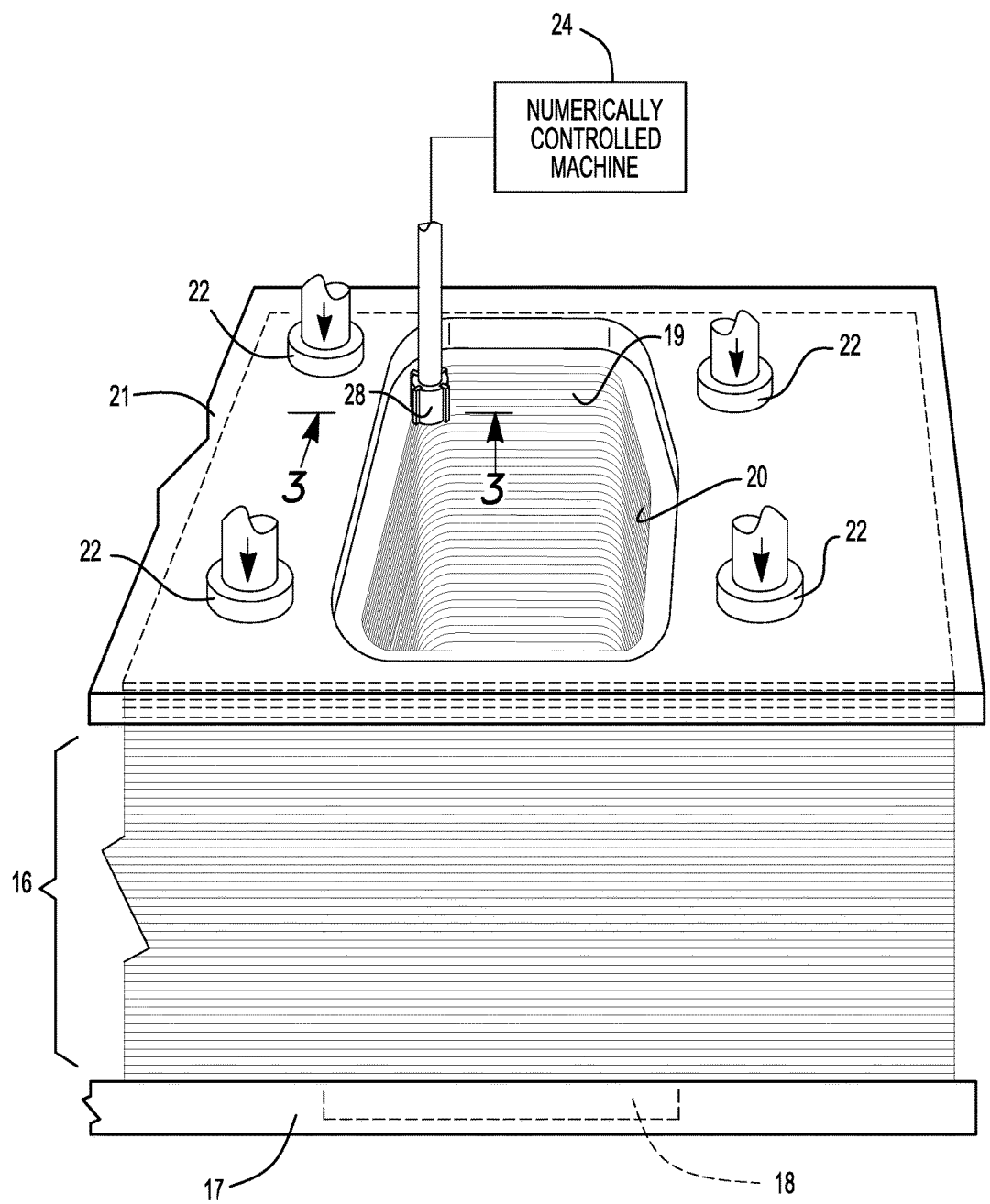
FIG. 2 is a perspective view of a numerically controlled machine milling the inner periphery of an internal opening in a plurality of blanks that are clamped in place with the openings in alignment.

Referring to FIGS. 1a, 1b, and 2, inner peripheries 20 of internal openings 19 contain a band of highly work hardened material which may include edge defects (not shown) created when the internal openings 19 are blanked. The blanks 15 may be imperfectly stacked with some of the blanks 15 being offset relative to the other blanks 15 in the stack 16. The blanks 15 are "generally aligned" on the stack meaning that the blanks 15 are stacked within +/−1 mm of the average stack location with the overall stack being +/−1 mm over the height of the stack 16.

Referring to FIG. 2, a plurality of blanks 15, or stack of blanks 16, is shown supported on a pallet 17 and sandwiched between a top plate 21 and the pallet 17. The internal openings 19 in the stack of blanks 16 are held in place by a plurality of clamping members 22 that are shown engaging the top plate 21. The top plate 21 functions to distribute the clamping loads applied by the clamping members 22. Other clamping arrangements may also be used to apply a clamping load to the stack 16. A numerically controlled machine 24 (herein after a "NC machine") is shown with a rotary cutting tool 28, or mill, that machines the inner periphery 20 of the internal openings 19.

Figure 3:
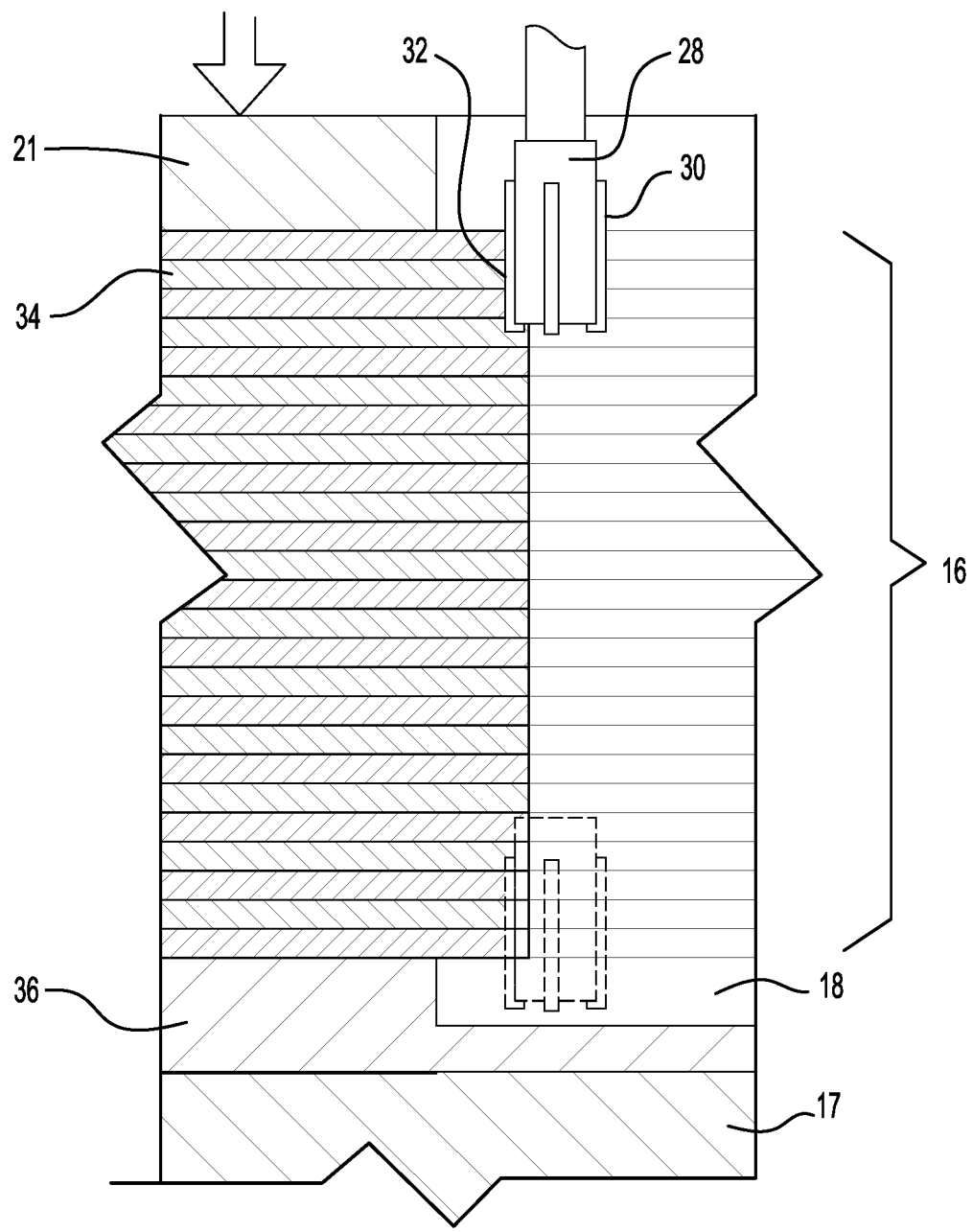
FIG. 3 is a fragmentary cross-section view taken along the line 3-3 in FIG. 2 showing a rotary cutting tool removing material from the inner periphery of the internal openings in the stack of blanks.

Referring to FIGS. 2 and 3, the stack of blanks 16 is shown being compressed between the top plate 21 and pallet 17. The rotary cutting tool 28 is shown performing a NC machine controlled milling operation on the inner periphery 20 of the internal openings 19. The cutter 28 removes material from the inner periphery 20 of the stack of blanks 16 that may be milled as if it was a monolithic metal structure because of the pressure applied by the clamping members 22 to the top plate 21. The NC machine 24 is initialized by aligning the NC machine 24 relative to the location of the stack 16 on the pallet 17. The rotary cutting tool 28 includes a plurality of cutter inserts 30 that form a milled surface 32 on the abutting blanks 15 to a finish dimension. The machining operation may be performed with or without a machining lubricant.

At least one metal thickness of the sheared edge, or blanked edge, is removed to facilitate subsequent hole expansion. The internal openings 19 may be milled up to 4 mm to compensate for stacking tolerance.

As shown in FIG. 3, several machined blanks 34 are illustrated in the top portion of the stack of blanks 16. The rotary cutting tool 28, as illustrated, moves from the top of the stack of blanks 16 (as shown in solid lines) to the position shown in phantom lines at the bottom of the stack of blanks 16. A spacer 36 is placed on the base 17, or pallet, to allow the rotary cutting tool 28 to mill all of the blanks 15 in the stack of blanks 12 by providing a clearance area 38 defined below the stack of blanks 16 and above the pallet 17. The spacer 36 and pallet 17 are shown as separate parts in FIG. 3. Alternatively, the space 18 may be defined by the pallet as shown in FIG. 1a.

Figure 4:
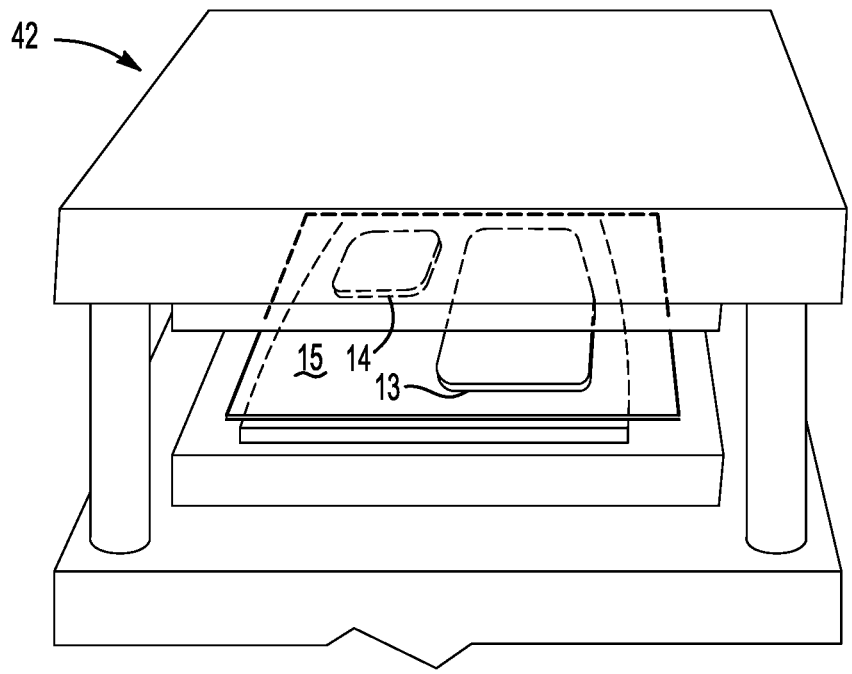
FIG. 4 is a diagrammatic perspective view of a draw die for a body side panel with a blank loaded into the die to be drawn into a desired shape.

Referring to FIG. 4, a blank 15 for a body side panel (not shown) is disposed in a draw die 42 that is part of a press line that forms the body side panel. The sheet metal press 42 expands the internal openings 19 in individual blanks 15.

Figure 5:
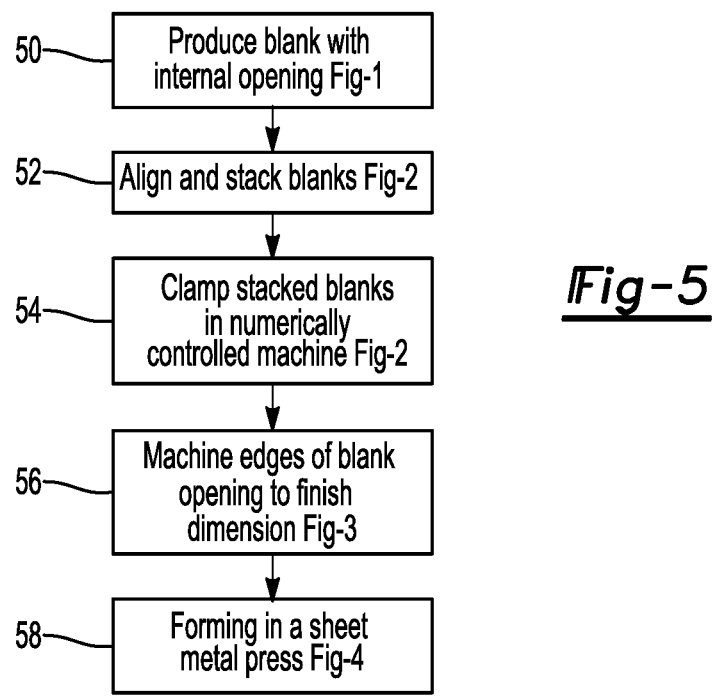
FIG. 5 is a flowchart illustrating the steps of the manufacturing process for forming a sheet metal panel including a large internal opening that is machined to remove edge defects.

Referring to FIG. 5 and with continued reference to the other drawings, the process is disclosed with reference to a flowchart 50. The process begins by producing a blank 15 in a blanking press 10, or punching operation, to form the outer periphery of the blank and internal openings 19. At 52, the blanks 15 are generally aligned and stacked into a stack of blanks 16, however, some of the blanks 15 may be imperfectly stacked. Imperfectly stacked blanks 15 with misaligned internal openings 19 may be compensated for by subsequent machining to the finish dimension. At 54, the stack of blanks 16 is clamped in a NC machine 24 that holds the blanks 15 together and generally in alignment. At 56, the inner periphery 20 of the internal opening 19 is machined to the finish dimension of the milled surface 32. After machining, the stack of blanks 16 is cleaned by brushing or blowing machining chips off of the stack 16. At 58, the blank 15 is separated from the stack of blanks 16 and each individual blank 15 is formed in a sheet metal press 42 to the desired overall shape of the finished part (not shown).

While the method is described with reference to milling internal openings 19 such as door openings 13 and window openings 14, the method is also applicable to smaller openings or outside trim edges that are subsequently stretched in the forming process.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method of manufacturing a sheet metal part comprising:
    cutting a plurality of blanks with each blank defining internal openings from a plurality of sheet metal segments;
    stacking the plurality of blanks with the internal openings aligned;
    machining inner perimeters of the internal openings with a rotary cutting tool to a finish dimension; and
    forming the plurality of blanks individually in a sheet metal forming operation after machining the internal openings with the rotary cutting tool, wherein the inner perimeter of the internal openings in each individual blank are expanded as the individual blank is formed.

2. The method of claim 1 further comprising:
    clamping the plurality of blanks together before machining.

3. The method of claim 2 wherein the step of clamping the plurality of blanks together is performed in a numerically controlled machine tool.

4. The method of claim 1 wherein the rotary cutting tool is a milling tool.

5. The method of claim 1 wherein the sheet metal part is a body side panel for a vehicle.

\* \* \* \* \*